United States Patent [19]

Taylor, Jr.

[11] 4,141,311
[45] Feb. 27, 1979

[54] LIQUID LEVEL INDICATING DEVICE FOR MOVABLY MOUNTED DISPENSER TANKS

[75] Inventor: Benson T. Taylor, Jr., Floyd Knobs, Ind.

[73] Assignee: General Electric Company, Louisville, Ky.

[21] Appl. No.: 852,118

[22] Filed: Nov. 16, 1977

[51] Int. Cl.² .......................................... G01F 23/00
[52] U.S. Cl. .................................. 116/227; 134/113; 116/276
[58] Field of Search .................... 116/118 R; 73/425.4, 73/323, 334; 222/158, 154, 156, 157; 134/113

[56] References Cited

U.S. PATENT DOCUMENTS

| 2,017,209 | 10/1935 | Kennedy | 222/158 |
| 2,557,243 | 6/1951 | Woosley | 222/158 |
| 3,021,863 | 2/1962 | Low | 137/209 |
| 3,102,664 | 9/1963 | Lines | 222/70 |
| 3,152,723 | 10/1964 | Perl et al. | 116/118 R |
| 3,199,733 | 8/1965 | Perl | 222/70 |
| 3,370,597 | 2/1968 | Fox | 134/58 |
| 3,608,514 | 9/1971 | Dunn | 116/118 R |

FOREIGN PATENT DOCUMENTS

| 865810 | 2/1953 | Fed. Rep. of Germany | 222/158 |
| 2407544 | 8/1975 | Fed. Rep. of Germany | 134/113 |
| 1389907 | 1/1965 | France | 222/158 |

*Primary Examiner*—S. Clement Swisher
*Assistant Examiner*—Denis E. Corr

*Attorney, Agent, or Firm*—Bruce A. Yungman; Radford M. Reams

[57] ABSTRACT

A liquid level indicator device for providing a visual indication of the level of liquid within a movably mounted tank, disclosed as a dishwasher door mounted rinse aid liquid dispenser tank, in which the dispenser tank is alternately positioned in either the vertical or horizontal position by the opening and closing of the door. The liquid level indicator includes a tank wall mounted indicator housing defining a viewing chamber into which is passed a small quantity of liquid when the tank is in the vertical or door closed position if the level is above a predetermined level and a portion of which liquid is retained within the viewing chamber as the tank moves to the door open position to enable viewing of the liquid through a sight window provided. The capture and retention of liquid within the viewing chamber is carried out by means of a catch cup mounted beneath the sight window, with clearance spaces allowing entrance of liquid when the dispenser tank is in the vertical position, but the orientation of the catch cup preventing escape of the liquid as the dispenser tank is moved to the horizontal position and the liquid retreats from the tank wall to which the indicator housing is mounted. The vividness of the visual impression created by the presence of the liquid in the viewing chamber is enhanced by the use of high contrast treatment of the bottom surface of the catch cup within which the liquid is retained.

7 Claims, 6 Drawing Figures

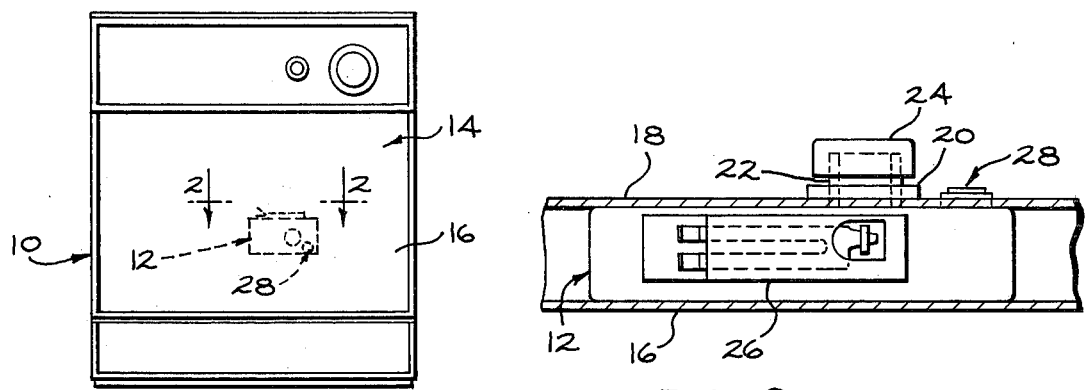
FIG.1
FIG.2
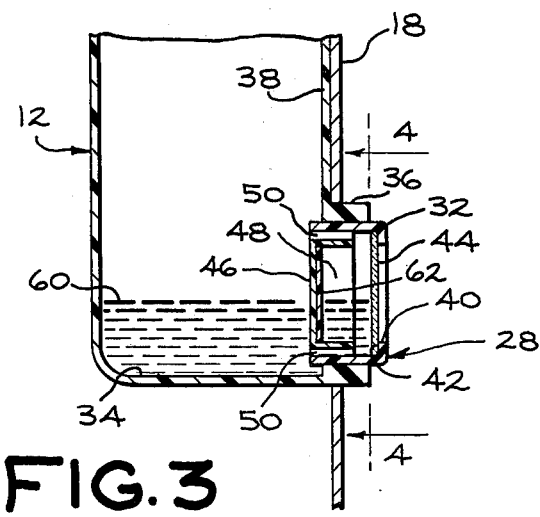
FIG.3
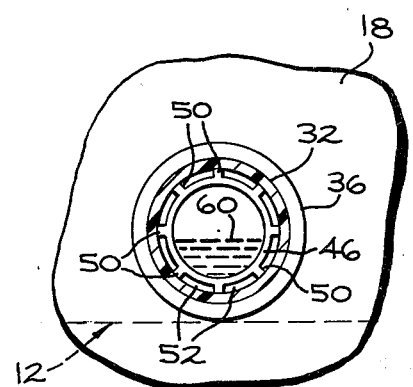
FIG.4
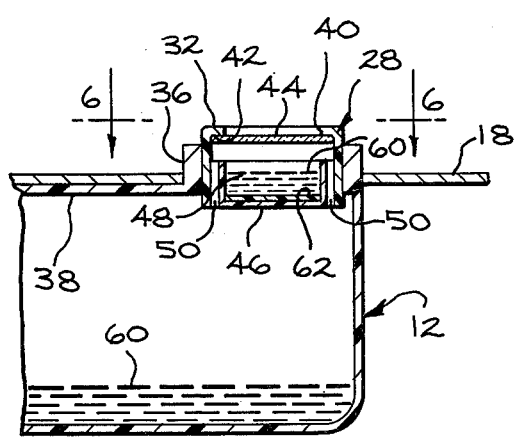
FIG.5
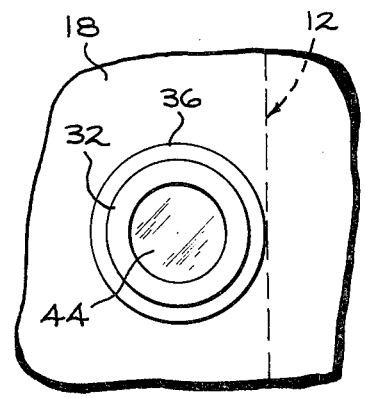
FIG.6

LIQUID LEVEL INDICATING DEVICE FOR MOVABLY MOUNTED DISPENSER TANKS

BACKGROUND OF THE INVENTION

1. Field of the Invention

This invention concerns liquid level indicator devices and more particularly is concerned with liquid level indicators which provide a visual indication of the level of liquid enclosed in movably mounted tanks such as rinse aid dispensing tanks mounted within the inner and outer door of a front loading dishwasher, in which the tank assumes horizontal and vertical positions as the door is opened and closed.

2. Background of the Invention

It is common practice to mount detergent or rinse aid dispensing tanks within the space between the outer and inner door panels of modern-day dishwashing machines. Since such liquids need only be added occasionally, a need exists to conveniently determine the liquid level. While many relatively complex liquid level indicating devices could theoretically provide such a ready indication, the cost considerations for such applications precludes use of any but the simplest devices.

The design of such a device is complicated by the mounting of the tank within the opaque structure defined by the inner and outer dishwasher door panels, as well as by the movable position of the dispenser tank as the door is opened and closed.

The position of the tank within the door creates difficulties since any viewing device which was attempted to be inserted within the tank which would depend on the ambient light within the tank, would necessarily produce poor results due to the low light level existing within the space between the opaque door panels. Such an approach is described in U.S. Pat. No. 3,152,723. The need to extend a viewing device into the tank has been heretofore required by the nature of the installation, i.e., the level cannot be viewed with the door closed since it would be objectionable for aesthetic reasons to have an exteriorly mounted level indicator. On the other hand, the liquid retreats from the tank wall adjacent the inner panel upon opening the dishwasher door, preventing direct sighting of the tank contents through an opening in the inner panel.

Since the dispenser tanks are typically checked for the proper liquid level when the dishwasher door is in the open position, the tanks are then in the horizontal position usually presenting the greatest sidewall area to containment of the fluid and the depth is relatively slight, even though a significant quantity of liquid may remain which makes the level difficult to gauge.

It should be noted that an indication of the relative level at all times is not really required, i.e., only when the tank level approaches empty would an indication be necessary.

Accordingly, it is an object of the present invention to provide a simple, low cost liquid level indicator arrangement for providing a visual indication of the liquid level in a movably mounted tank above or below a predetermined minimum level.

It is another object of the present invention to provide such a liquid level indicator which is adapted to determine the level of liquid in a tank installed within an opaque enclosing structure.

It is yet another object of the present invention to provide such a liquid level indicator which will provide an indication of the level of the liquid within the tank when it is in a vertical or dispensing position with the indicator being viewed with the tank disposed in a horizontal position.

It is still another object of the present invention to provide such a low cost liquid level indicator particularly adapted for door mounted rinse aid tank dispensers for dishwashers which will provide visual indication when the level of the rinse aid liquid in the tank declines below a predetermined level.

A further object of the present invention is to provide such an indicator apparatus showing a visual indication of the level which allows the liquid level within the tank to be visually indicated while the tank is in the door open, horizontal position at a portion of the tank which the liquid retreats without depending on the ambient light level within the tank.

SUMMARY OF THE INVENTION

These and other objects, which will become apparent upon a reading of the following specification and claims, are accomplished by an indicator device including an indicator housing within which is defined a viewing chamber and the contents of which may be viewed through a sight window mounted in the indicator housing. The indicator housing is installed in the lower portion of the tank in fluid communication with the interior of the tank such that liquid passes into the viewing chamber whenever the depth of liquid within the indicator housing is at or above the predetermined level within the dispenser tank. A portion of the quantity of liquid passing into the viewing chamber when the dispensing tank is in the vertical position is retained within the viewing chamber as the dispenser tank moves to the horizontal, door open position with the liquid retreating from the indicator device by means of a catch cup disposed in the indicator housing beneath the sight window. The catch cup is mounted by means of a plurality of circumferentially spaced ribs and is spaced from the sight window such that the liquid passing into the viewing chamber may pass into the catch cup by flowing through the clearance between the circumferentially spaced ribs and the clearance between the catch cup and the sight window. Upon opening of the dishwasher door, the catch cup, retaining a portion of the liquid, allows it to be viewed through the sight window from above the open dishwasher door. The indicator housing portion to which is mounted the viewing window protrudes through the inner door for this purpose and to allow the ambient light within the room to be utilized in inspecting the contents of the viewing chamber. A contrast enhancing treatment of the bottom of the catch cup may be utilized to enhance the visual indication provided by the presence of liquid.

BRIEF DESCRIPTION OF THE DRAWINGS

FIG. 1 is a front elevational view of a dishwasher showing the position of the rinse aid liquid dispenser tank within the access door of the dishwasher.

FIG. 2 is a view of the section 2—2 through a portion of the dishwasher door shown in FIG. 1.

FIG. 3 is an enlarged fragmentary view of the lower portion of the dispenser tank and indicator device according to the present invention.

FIG. 4 is a view of the section 4—4 taken through the indicator device in FIG. 3.

FIG. 5 is a sectional view through the lower portion of the tank and indicator device with the tank in the horizontal position and depicting the redistribution of liquid which occurs upon opening of the dishwasher door.

FIG. 6 is a view of the indicator housing and adjacent tank portion taken in the direction of the arrows 6—6 in FIG. 5.

DETAILED DESCRIPTION OF THE PREFERRED EMBODIMENT

In the following detailed description, certain specific terminology will be utilized for the sake of clarity and a specific embodiment disclosed in accordance with the requirements of 35 USC 112, but it is to be understood that the same is not intended to be limiting and indeed should not be so construed inasmuch as the invention is capable of taking many forms and variations within the scope of the appended claims.

Referring to the drawings, the liquid level indicator device according to the present invention is contemplated for particular application to the application described above with respect to liquid rinse aid dispenser tanks 12 mounted to the dishwasher door 14 of the dishwasher 10. Accordingly, in this installation, the dispenser tank 12 is mounted to be movable between a first and second position, i.e., is vertically positioned with the dishwasher door 14 closed and horizontally positioned with the door open. The level of liquid is to be determined when the dispenser tank 12 is in its first or vertical position, but an indication provided when in its second or horizontal position with the door 14 open.

Such dispensing tanks are commonly utilized for the automatic dispensing of a rinse aid liquid which is added to the rinse water in relatively minute quantities during the rinse cycle just prior to drying so as to minimize spotting in hard water areas. As noted, these tanks generally are mounted so as to dispense the liquid during the operation of the machine with the dishwasher door 14 closed, such as to be vertically disposed during the functional operation of the dispenser tank 12, i.e., during the dispensing of the liquid. Commonly, the liquid dispensing tanks 12 are mounted within the door 14, since dishwasher doors are generally constructed with an outer finished panel 16 and an inner panel of stainless steel, coated steel or of a molded plastic such as inner panel 18, the space between conveniently houses various functional components of the dishwasher and provides a waterproof liner for the interior chamber of the dishwasher.

As shown in FIG. 2, the dispensing tank 12 is mounted between the outer panel 16 and the inner panel 18 as by a retainer nut 20 engaging a threaded filler spout 22 extending through the inner panel 18, with a filler cap 24 provided.

The automatic dispenser mechanism is shown in outline at 26, but since the present invention is not concerned with this aspect of the dispenser, no details are here described.

The indicator device 28 according to the present invention is located at a lower level of the dispensing tank 12 corresponding to the predetermined level of liquid 60 when the tank is in its vertical position with the door 14 closed such as shown in FIGS. 1 and 3. The indicator device 28 is further located on the side of the dispensing tank 12 from which the liquid retreats upon the dispenser tank 12 moving to its second or horizontal position with the dishwasher door 14 open. A portion thereof protrudes through the inner door panel 18 so as to be visible from above the dishwasher door 14 when the dishwasher door 14 is opened.

FIG. 3 is an enlarged sectional view showing the details of the liquid level indicator device 28 according to the present invention and which includes an indicator housing 32 which is disposed within the lower portion of the dispenser tank 12 just above the wall 34 which forms the bottom when the dispensing tank 12 is in the vertical position shown.

The indicator housing 32 may either be formed integrally with the dispenser tank 12 or may comprise a separate element molded or pressed, as shown, into a boss 36 molded into the dispenser tank sidewall 38 which is adjacent the inner door panel 18. The indicator housing 32 has an opening 40 at a portion thereof protruding through the dispenser tank 12 above the inner door panel 18, and is also formed with a radially inward directed flange 42 which serves to retain a transparent or translucent panel comprising the sight window 44 which is sealed into the opening 40 with a waterproof adhesive. The space within the indicator housing 32 beneath the sight window 44 is defined as a viewing chamber 48 within which a quantity of the liquid is caused to be present whenever the liquid level is at or above the predetermined level in the dispenser tank 12.

The liquid is captured within the viewing chamber 48 by means including a catch cup 46 pressed within the interior bore of the indicator housing 32. Catch cup 46 comprises a cylindrical element closed at the bottom of the interior which substantially occupies the viewing chamber 48, by being positioned beneath the sight window 44 such that the viewing chamber 48 is visible through the sight window 44. The catch cup 46 is mounted within the indicator housing 32 by means of a series of ribs 50 extending about the circumference of the catch cup 46 which serve to mount the catch cup 46 within the interior bore of the indicator housing 32 while providing clearance passages intermediate the ribs 52 which allow free flow of the liquid 60 disposed within the dispenser tank 12. The lower of the spaces 52 provide a flow passage and the upper of the spaces 52 provide air venting of the viewing chamber 48 so as to allow the liquid to be passed freely into the viewing chamber 48 when the dispenser tank 12 is positioned vertically as shown in FIG. 3. The level of liquid will, thus, be the same in both the dispenser tank 12 and within the viewing chamber 48, as indicated in FIG. 3.

Upon swinging of the door 14, a portion of the quantity of liquid within the viewing chamber 48 is retained by the repositioning of the catch cup 46 with its open end now facing upwardly, the liquid occupying a depth corresponding to the volume of liquid captured when the dispensing tank 12 is in the vertical position.

The rinse aid liquid is generally colored with a dye such as a blue coloring material such as to be highly visible under the bright light conditions which would exist in the kitchen environment in which the dishwasher is located. Thus, the liquid 60 within the viewing chamber 48 becomes highly visible through the sight window 44. The volume of liquid within the viewing chamber 48 is controlled by the depth of the catch cup 46 and accordingly may be selected to provide sufficient liquid level within the viewing chamber 48 providing ready visibility of the liquid as indicated in FIG. 6.

A contrasting surface treatment may be applied to the bottom of the catch cup 46 to improve visibility of the liquid such as an orange plastic member 62 molded into or physically placed at the bottom of the catch cup 46 such that even when the liquid level declines to a very thin layer, the presence of the liquid will still be highly visible.

Also, a mirror or mirrored plastic could be utilized for the same purpose.

It can be seen in essence that this indicating arrangement provides a means for retaining a portion of the liquid to be observed at the upper portion of the tank when the tank 12 is in the horizontal position notwithstanding the retreat of the liquid from this side of the tank upon movement of the dispenser tank 12 to the horizontal position. This thus allows the direct sighting with the use of ambient light within the room rather than within the tank in the interior of the dishwasher door 14.

This is accomplished by means providing a viewing chamber visible from an upper direction and means for causing a quantity of liquid to flow into the viewing chamber when the dispenser tank 12 is in its first or vertical position, capturing the liquid for retention as the door is swung open and the tank assumes its second or horizontal position.

This very effectively overcomes the liquid level indication problems discussed above in a very simple but effective manner which provides all the requirements of such liquid level indications at very low cost.

As the level declines to approach the very bottom of the dispenser tank 12, the liquid no longer flows into the viewing chamber 48 such that as the door is swung open, its absence in the viewing chamber 48 is immediately apparent. It can be further seen that this arrangement is most advantageous in that the level is checked when the tank is in the vertical position since the depth of liquid in this position is generally greatest and is also of most significance in assuring that the level is adequate since the dispenser tank 12 functions when so disposed.

Many variations of this concept are, of course, possible since there are a great number of ways of causing such a viewing chamber to be filled with liquid when the tank is in the vertical position and capturing the liquid for viewing when the dishwasher door is swung to the horizontal position. In addition, other applications may effectively make use of this device where the tank is movably mounted in positions causing the liquid level to retreat away from that portion of the tank whereat the indication is to be obtained.

It is to be noted that while the description above is in terms of providing a visual indication when the liquid level is "at or above" a predetermined level, there is also inherently provided an indication when the level is below the predetermined level, since the absence of that visual indication of course functions as an indicator as well.

The "level" of liquid in the tank of course can be measured in every possible orientation of the tank to the vertical position, and the present invention could have application to obtaining an indication measurement of the level in any tank position, since a measure of the quantity of liquid is thereby obtained. A particular advantage of one feature of the invention is, however, that the closed door level is obtained in which the depth is more significant since this is the functional position of the tank, and also the depth is typically greater for a given quantity of liquid in the tank due to the relative dimensions of the tank to make measurement easier and more reliable.

It should be apparent to those skilled in the art that the embodiments described heretofore are considered to be the presently preferred forms of this invention. In accordance with the Patent Statutes, changes may be made in the disclosed mechanism in the manner in which it is used without actually departing from the true spirit and scope of this invention.

What is claimed is:

1. In combination with a dishwasher of the type including a dishwasher door movable from a closed position to an open position and further including a liquid dispenser tank mounted to said dishwasher door, a liquid level device for providing a visual indication whenever said level is at or above a predetermined level in said tank when said dishwasher door is in the open position, said indicator device comprising:

an indicator housing having a viewing chamber formed therein, said indicator housing being mounted to said dispenser tank on a side thereof from which the liquid retreats upon opening said dishwasher door;

a sight window positioned in said indicator housing to allow observation of said viewing chamber;

said indicator housing further being mounted on the inside of said dishwasher door to be visible when said dishwasher door is in the open position;

means causing a quantity of liquid in said dispenser tank to flow into said viewing chamber when said dishwasher door is in the closed position and said liquid level is at or above said predetermined level in said dispenser tank;

said indicator device further including means for retaining a quantity of said liquid flowing into said dispenser tank upon movement of said dishwasher door to the open position, whereby the presence of said quantity of liquid in said viewing chamber may be observed through said sight window in said indicator housing, whereby a visual indication is provided whenever the liquid in said dispenser tank is at or above the predetermined level when said dishwasher door is in the open position.

2. The dishwasher according to claim 1 wherein said means retaining a portion of said liquid in said viewing chamber comprises a catch cup disposed below said sight window, said catch cup having a closed bottom positioned to capture said liquid upon movement of said dishwasher door to said second position.

3. The dishwasher according to claim 1 wherein said indicator device is mounted to said tank to dispose said viewing chamber below said predetermined level when said dishwasher door is in said closed position and said means causing said flow thereinto includes spaces allowing flow from said tank into said viewing chamber, whereby said liquid level is determined when said dishwasher door is in said closed position.

4. The dishwasher according to claim 2 wherein said catch cup is mounted within said indicator housing with clearance spaces between said catch cup and said indicator housing and further is mounted with a clearance space between said sight window and the adjacent edge of said catch cup whereby when said indicator device is below said predetermined liquid level, said liquid may flow into said viewing chamber by flowing through said clearance spaces when said dishwasher door is in said closed position.

5. The dishwasher according to claim 4 wherein said catch cup is cylindrically shaped and wherein said clearance spaces extend about the circumference of said catch cup whereby said clearance spaces may also act as vent passages allowing entrance of said liquid into said viewing chamber.

6. The dishwasher according to claim 2 further including a color contrasting treatment applied to the bottom surface of said catch cup whereby the visibility of said liquid in said catch cup is enhanced.

7. The dishwasher according to claim 1 wherein said dishwasher door is mounted to be vertical in the closed position and horizontal in the open position, whereby said indicator device provides a visual indication when said dishwasher door is open and horizontal.

* * * * *